United States Patent
Al-Jodai et al.

(10) Patent No.: US 10,947,115 B2
(45) Date of Patent: Mar. 16, 2021

(54) PROCESS FOR SEPARATION OF HYDROGEN AND OXYGEN

(71) Applicant: SABIC Global Technologies B.V., Bergen op Zoom (NL)

(72) Inventors: Abdulaziz M. Al-Jodai, Riyadh (SA); Israr Ul Haque, Riyadh (SA); Nasser Ali Aldalaan, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 455 days.

(21) Appl. No.: 15/777,956

(22) PCT Filed: Nov. 14, 2016

(86) PCT No.: PCT/IB2016/056843
§ 371 (c)(1),
(2) Date: May 22, 2018

(87) PCT Pub. No.: WO2017/089924
PCT Pub. Date: Jun. 1, 2017

(65) Prior Publication Data
US 2018/0346329 A1 Dec. 6, 2018

Related U.S. Application Data

(60) Provisional application No. 62/260,009, filed on Nov. 25, 2015.

(51) Int. Cl.
*C01B 3/04* (2006.01)
*C01B 3/50* (2006.01)
(Continued)

(52) U.S. Cl.
CPC ............ *C01B 3/042* (2013.01); *B01D 53/229* (2013.01); *B01D 53/46* (2013.01);
(Continued)

(58) Field of Classification Search
CPC ................ B01D 53/46; B01D 53/8671; B01D 2255/1021; B01D 53/229; B01D 2256/16;
(Continued)

(56) References Cited

U.S. PATENT DOCUMENTS 2,582,885 A * 1/1952 Rosenblatt ............. B01D 53/34
423/219
3,788,037 A 1/1974 Shell et al.
(Continued)

FOREIGN PATENT DOCUMENTS

RO 133144 A2 * 3/2019 ............. B01J 19/08
SU 1623737 1/1991
(Continued)

OTHER PUBLICATIONS

International Search Report and Written Opinion Issued in Corresponding PCT Application No. PCT/IB2016/056843, dated Feb. 7, 2017.
(Continued)

*Primary Examiner* — Timothy C Vanoy
(74) *Attorney, Agent, or Firm* — Norton Rose Fulbright US LLP

(57) ABSTRACT

Embodiments of the invention are directed to methods, processes, and systems for safely and reliably purifying hydrogen from a gas mixture containing hydrogen and oxygen.

20 Claims, 1 Drawing Sheet

(51) Int. Cl.
  *B01J 23/42*   (2006.01)
  *B01J 35/00*   (2006.01)
  *B01J 19/12*   (2006.01)
  *B01D 53/22*   (2006.01)
  *B01D 53/86*   (2006.01)
  *C02F 1/32*    (2006.01)
  *C02F 1/72*    (2006.01)
  *B01D 53/46*   (2006.01)

(52) U.S. Cl.
  CPC ........ *B01D 53/8671* (2013.01); *B01J 19/122* (2013.01); *B01J 23/42* (2013.01); *B01J 35/004* (2013.01); *C01B 3/50* (2013.01); *C01B 3/501* (2013.01); *C02F 1/32* (2013.01); *C02F 1/725* (2013.01); *B01D 2255/1021* (2013.01); *B01D 2256/16* (2013.01); *B01D 2257/104* (2013.01); *B01J 2219/0877* (2013.01); *B01J 2219/0892* (2013.01); *B01J 2219/1203* (2013.01); *C01B 2203/0405* (2013.01); *C01B 2203/0465* (2013.01); *C02F 2305/10* (2013.01); *Y02E 60/36* (2013.01)

(58) Field of Classification Search
  CPC ... B01D 2257/104; Y02E 60/36; C02F 1/725; C02F 2305/10; C02F 1/32; B01J 23/42; B01J 19/122; B01J 2219/0877; B01J 2219/1203; B01J 35/004; B01J 2219/0892; C01B 2203/0465; C01B 3/501; C01B 3/042; C01B 2203/0405; C01B 3/50
  See application file for complete search history.

(56) References Cited

U.S. PATENT DOCUMENTS

| 4,476,105 | A | 10/1984 | Greenbaum |
| 4,960,579 | A * | 10/1990 | Campbell ............ B01D 53/047 422/211 |
| 5,397,559 | A | 3/1995 | Kogan |
| 8,657,920 | B2 | 2/2014 | Nakanishi et al. |
| 9,975,115 | B2 * | 5/2018 | Nakanishi ............ B01J 27/0573 |
| 2008/0311015 | A1 | 12/2008 | Hofmann et al. |
| 2013/0252121 | A1 | 9/2013 | Oppenheim |
| 2014/0272623 | A1 * | 9/2014 | Jennings ................ C25B 1/003 429/411 |
| 2014/0342254 | A1 * | 11/2014 | Jennings ................ C01B 3/501 429/416 |

FOREIGN PATENT DOCUMENTS

| WO | WO 2017/089924 | 6/1917 |
| WO | WO 1997/010172 | 3/1997 |

OTHER PUBLICATIONS

"Catalogue Handbook of Fine Chemicals," *Aldrich*, 1994, p. 809.

* cited by examiner

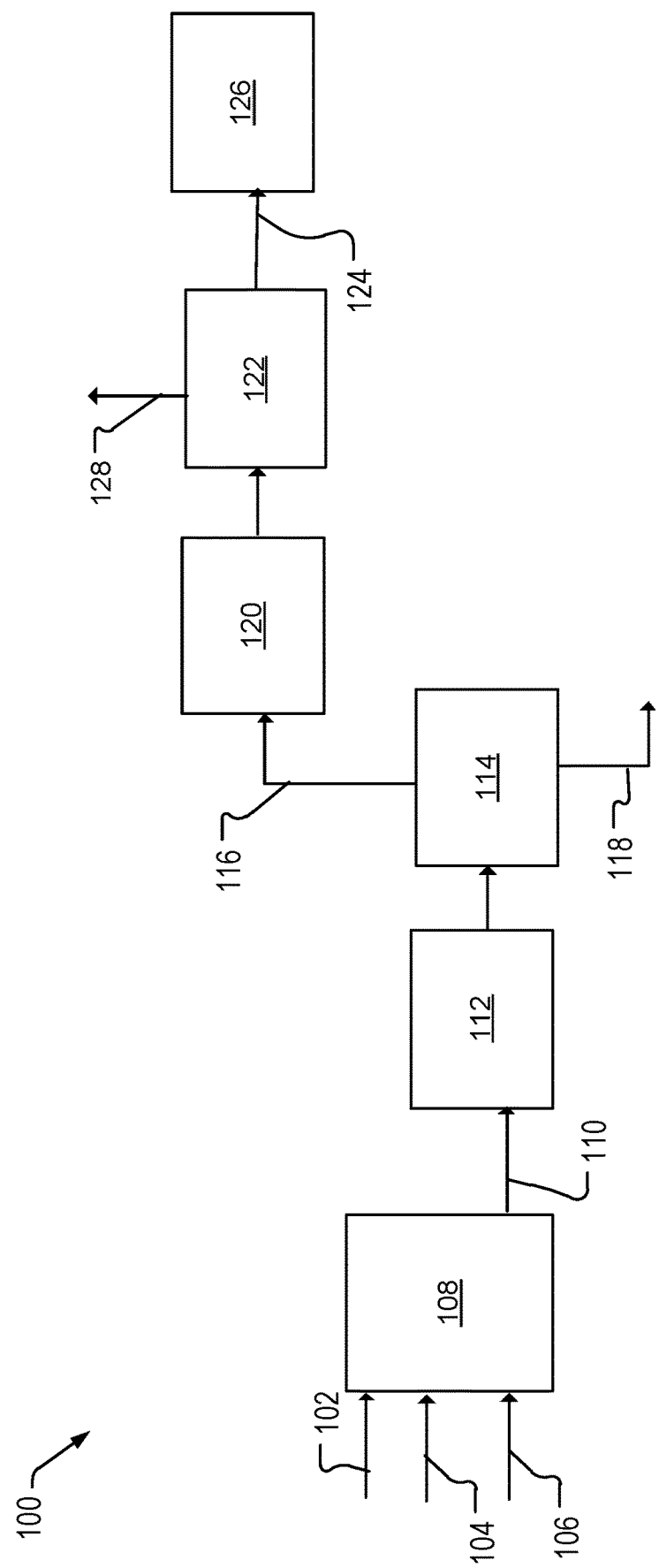

PROCESS FOR SEPARATION OF HYDROGEN AND OXYGEN

CROSS-REFERENCE TO RELATED APPLICATIONS

This application is a national phase application under 35 U.S.C. § 371 of International Application No. PCT/IB2016/056843 filed Nov. 14, 2016, which claims the benefit of priority of U.S. Provisional Patent Application No. 62/260,009, filed Nov. 25, 2015. The entire contents of each of the above-referenced disclosures are specifically incorporated herein by reference without disclaimer.

BACKGROUND

Hydrogen fuel production has gained increased attention as oil and other nonrenewable fuels become increasingly depleted and expensive. Methods such as photocatalytic water splitting are being investigated to produce hydrogen fuel, which burns cleanly and can be used in a hydrogen fuel cell. Water splitting holds particular interest since it utilizes water, an inexpensive renewable resource.

Technologies are currently under development for producing energy from renewable and sustainable resources such as water. Water can be used as a feedstock for photocatalytic splitting using sun light to split water molecules into hydrogen and oxygen. There is currently a lack of commercial methods or technologies for purifying hydrogen gas produced via this process. The process produces a highly explosive gas mixture, which requires using an as yet defined techniques and/or system to separate and purify hydrogen from oxygen. The currently known methods for separating the gas mixture produced by water lack reliability and safety, and are considered unrealistic from engineering point of view.

Thus, there remains a need for additional methods, processes, and systems for purifying hydrogen from a gas mixture containing hydrogen and oxygen.

SUMMARY

Embodiments of the current disclosure relate to methods, processes, and systems for safely and reliably purifying hydrogen from a gas mixture containing hydrogen and oxygen, such as that produced by the photocatalytic water splitting process. The solution separates a highly flammable and explosive gas containing hydrogen and oxygen produced by a photocatalytic water-splitting reaction. Methods, apparatus and systems described herein provide for separating hydrogen from oxygen and further purifying hydrogen from impurities in a high-pressure process.

Certain embodiments are directed to a process for producing hydrogen from water. A process can include one or more of the following steps: (a) contacting a water source with a water splitting photocatalyst and exposing the water/photocatalyst to light under conditions that split water into hydrogen and oxygen forming a feed source for hydrogen separation and purification; (b) separating hydrogen from a feed source by (i) compressing a feed source to at least 30 bars in a spark free environment forming a compressed feed source; (ii) separating hydrogen from the compressed feed source by contacting a selectively permeable membrane with the compressed feed source, wherein hydrogen selectively permeates the membrane forming a hydrogen permeate and a hydrogen deficient retentate; and (iii) collecting the hydrogen permeate; and (c) purifying the hydrogen permeate by (i) compressing the hydrogen permeate to at least about 30 bars forming a compressed hydrogen permeate, and (ii) combusting the compressed hydrogen permeate to remove residual oxygen and forming a purified hydrogen stream; and (d) collecting, storing, and/or utilizing the purified hydrogen. In certain aspects, the feed source is compressed to at least or about 30, 40, 50, 100, to 150 bars. In a further aspect, the hydrogen permeate is compressed to 10, 20, 30, 40, 50, 100, to 200 bars. In other aspects, the heat from the combustion process is used to generate steam that can be used in other processes. In certain aspects, the combustion chamber is configured to allow heating of water that is external to the chamber in which combustion is being initiated. The process further includes cooling the hydrogen stream and dehydrating the hydrogen stream.

In the process combustion can be performed at a pressure of 10, 25, 50, or 75 to 50, 75, or 100 $kg/cm^2g$, including all values and ranges there between. In a certain aspects, combustion is performed at about 33 $kg/cm^2g$. In further aspect, the combustion is performed at a temperature of between 500, 750, 1000 or 1500 to 1000, 1500, or 2000° C., including all values and ranges there between. In certain aspects, combustion is performed at a temperature of about 1400° C. In certain aspects, combustion is performed in a catalytic combustion unit such as a high pressure tubular vessel containing platinum catalyst. The heat produced due to auto-ignition of hydrogen with oxygen on platinum catalyst is used to produce high pressure steam from water external to the combustion chamber.

The process can further include collecting the retentate. The process can further include mixing the collected hydrogen permeate with an inert gas (e.g., argon or nitrogen). The process can include compressing the feed source to at least 40, 50, or 60 bar. The feed source can include about or at least 70 mol % hydrogen. In the process, the purified hydrogen permeate can include about or at least 90, 92, 94, 96, 98, up to 99.5 mol % hydrogen.

In some embodiments, the process is performed under conditions and using equipment to minimize spark generation during compression and transfer of gas source or products.

A purified hydrogen stream produced by the process described above and can have least 90, 95, 99, to 99.5 mol % hydrogen.

Further embodiments are directed to a hydrogen purification system that includes: (a) a photocatalytic reactor configured to operate at approximately atmospheric pressure for splitting water into hydrogen and oxygen; (b) a compressor configured to receive a feed stream from the photocatalyic reactor, the compressor being configured to compress the feed stream to at least 30 bar; (c) a membrane separation unit comprising a membrane that is selectively permeable to hydrogen and configured to (i) receive a pressurized feed stream from the compressor and (ii) produce a hydrogen permeate; (d) a second compressor configured to compress the hydrogen permeate to a pressure of at least 30 bar; and (e) a hydrogen purification unit configured to receive and combust the pressurized hydrogen permeate to produce medium pressure steam and a purified hydrogen stream. In a certain aspect, the combustion of the pressurized hydrogen permeate is performed in a catalytic combustion chamber. In a further aspect, the combustion chamber is an auto-ignition chamber. In a still further aspect, the combustion chamber is a platinum catalyst auto-ignition chamber. The system can further include a hydrogen storage device to collect and store the purified hydrogen stream.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa. Furthermore, compositions of the invention can be used to achieve methods of the invention.

The use of the words "a" or "an" when used in conjunction with any of the terms "comprising", "including", "containing", or "having" in the claims, or the specification, may mean "one," but it is also consistent with the meaning of "one or more", "at least one", and "one or more than one."

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods and systems of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods and systems of the present invention are their abilities to produce hydrogen under conditions and using equipment to minimize spark generation during compression and transfer of gas source or products.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 1 is a schematic of an embodiment of a hydrogen purification system disclosed herein.

DESCRIPTION

Embodiments of the current disclosure relate to methods, processes, and systems for safely and reliably purifying hydrogen from a gas mixture containing hydrogen and oxygen such as that produced by the photocatalytic water splitting process. The solution separates a gas containing hydrogen and oxygen produced near atmospheric pressure, which is considered to be highly flammable and explosive, produced by a photocatalytic water-splitting reaction. Methods, apparatus and systems described herein provide for separating hydrogen from oxygen and further purifying hydrogen from impurities in a high-pressure process.

Photocatalytic Water Splitting

Photocatalytic water splitting is the light-induced conversion reaction of water to hydrogen and oxygen. This reaction has attracted attention as one of the most promising hydrogen production processes. Photocatalytic water splitting is an artificial process for the dissociation of water into its constituent parts, hydrogen ($H_2$) and oxygen ($O_2$), using either artificial or natural light without producing greenhouse gases or having many adverse effects on the atmosphere. When $H_2O$ is split into $O_2$ and $H_2$, the stoichiometric ratio of its products is 2:1. The process of water-splitting is a highly endothermic process ($\Delta H>0$). Production of hydrogen from water requires large amounts of input energy, making it incompatible with existing energy generation.

There are several requirements for a photocatalyst to be useful for water splitting. The minimum potential difference (voltage) needed to split water is 1.23 eV at 0 pH. Since the minimum band gap for successful water splitting at pH=0 is 1.23 eV the electrochemical requirements can theoretically reach down into infrared light, albeit with negligible catalytic activity. These values are true only for a completely reversible reaction at standard temperature and pressure (1 bar and 25° C.). Theoretically, infrared light has enough energy to split water into hydrogen and oxygen; however, this reaction is kinetically very slow because the wavelength is greater than 380 nm. The potential must be less than 3.0 eV to make efficient use of the energy present across the full spectrum of sunlight. Water splitting can transfer charges, but not be able to avoid corrosion for long term stability. Defects within crystalline photocatalysts can act as recombination sites, ultimately lowering efficiency.

Materials used in photocatalytic water splitting fulfill the band requirements and typically have dopants and/or co-catalysts added to optimize their performance. A sample semiconductor with the proper band structure is titanium dioxide ($TiO_2$). However, due to the relatively positive conduction band of $TiO_2$, there is little driving force for $H_2$ production, so $TiO_2$ is typically used with a co-catalyst such as platinum (Pt) to increase the rate of $H_2$ production. It is routine to add co-catalysts to spur $H_2$ evolution in most photocatalysts due to the conduction band placement. Most semiconductors with suitable band structures to split water absorb mostly UV light; in order to absorb visible light, it is necessary to narrow the band gap.

Photocatalysts can suffer from catalyst decay and recombination under operating conditions. In certain aspects, catalyst decay becomes a problem when using a sulfide-based photocatalyst such as cadmium sulfide (CdS), as the sulfide in the catalyst is oxidized to elemental sulfur at the same potentials used to split water. Thus, sulfide-based photocatalysts are not viable without sacrificial reagents such as sodium sulfide to replenish any sulfur lost, which effectively changes the main reaction to one of hydrogen evolution as opposed to water splitting. Recombination of the electron-hole pairs needed for photocatalysis can occur with any catalyst and is dependent on the defects and surface area of the catalyst; thus, a high degree of crystallinity is required to avoid recombination at the defects.

Examples of photocatalyst include:

$NaTaO_3$:La—$NaTaO_3$:La yields the highest water splitting rate of photocatalysts without using sacrificial reagents. This UV-based photocatalyst was shown to be highly effective with water splitting rates of 9.7 mmol/h and a quantum yield of 56%. The nanostep structure of the material promotes water splitting as edges functioned as $H_2$ production sites and the grooves functioned as $O_2$ production sites. Addition of NiO particles as co-catalysts assisted in $H_2$ production; this step can be done by using an impregnation method with an aqueous solution of $Ni(NO_3)_2 \cdot 6H_2O$ and evaporating the solution in the presence of the photocatalyst.

$K_3Ta_3B_2O_{12}$—$K_3Ta_3B_2O_{12}$ is activated by solely UV light and above, does not have the performance or quantum yield of $NaTaO_3$:La. However, it does have the ability to split water without the assistance of co-catalysts and gives a quantum yield of 6.5% along with a water splitting rate of 1.21 mmol/h. This ability is due to the pillared structure of the photocatalyst, which involves $TaO_6$ pillars connected by $BO_3$ triangle units.

$(Ga_{0.82}Zn_{0.18})(N_{0.82}O_{0.18})$—$(Ga_{0.82}Zn_{0.18})(N_{0.82}O_{0.18})$ has one of the highest quantum yield in visible light for visible light-based photocatalysts that do not utilize sacrificial reagents. The photocatalyst gives a quantum yield of 5.9% along with a water splitting rate of 0.4 mmol/h. Tuning the catalyst is done by increasing calcination temperatures for the final step in synthesizing the catalyst. Temperatures up to 600° C. helped to reduce the number of defects, though temperatures above 700° C. destroyed the local structure around zinc atoms and was thus undesirable.

$Pt/TiO_2$—$TiO_2$ is a very efficient photocatalyst, as it yields both a high quantum number and a high rate of $H_2$ gas evolution. For example, $Pt/TiO_2$ (anatase phase) is a catalyst used in water splitting. These photocatalysts combine with a thin NaOH aqueous layer to make a solution that can split water into $H_2$ and $O_2$. $TiO_2$ absorbs only ultraviolet light due to its large band gap (>3.0 eV), but outperforms most visible light photocatalysts because it does not photocorrode as easily. Most ceramic materials have large band gaps and thus have stronger covalent bonds than other semiconductors with lower band gaps.

Cobalt based systems—Photocatalysts based on cobalt have been reported. Members are tris(bipyridine) cobalt(II), compounds of cobalt ligated to certain cyclic polyamines, and certain cobaloximes. Chromophores have reportedly been connected to part of a larger organic ring that surrounded a cobalt atom. The process is less efficient than using a platinum catalyst, cobalt is less expensive, potentially reducing total costs. The process uses one of two supramolecular assemblies based on Co(II)-templated coordination as photosensitizers and electron donors to a cobaloxime macrocycle.

Hydrogen Purification

The gas produced from the photocatalytic water-splitting process is at near atmospheric pressure and it can contain about 70% mol $H_2$, 25% mol $O_2$ and 5% mol $CO_2$. This gas, is compressed to increase the pressure of the gas to the desired delivery pressure. The compressor, for example, is a piston compressor, a diaphragm compressor, a scroll compressor, or other type of compressor. In certain aspects, the gas is compressed using a piston compressor. In certain aspects, the gas is compressed to approximately 30 bar and sent to membrane separation unit for bulk gas separation. For safety, the compressor should be a spark-free or spark-suppressed compressor.

Compressed gas is used as a medium in numerous applications. Among various known techniques for compression of gas, piston compressors constitute a specific example of compression devices. Piston compressors for small to intermediate pressures are commonly seen in automotive applications, whereas larger piston compressors are commonly found in large industrial and petroleum applications. A gas compressor is a mechanical device that increases the pressure of a gas by reducing its volume. In certain aspects, the compressor has an inlet and an outlet that are controlled by valves. At intake of gas into the cylinder, the inlet valve is opened and the outlet valve is closed. When the cylinder is filled with gas, the inlet is closed, while the outlet remains closed. The gas is then compressed to achieve an appropriate pressure and the outlet valve is opened through which the compressed gas is led. The compression cycle is repeated. Various compressor types can be used, such as diaphragm type compressors, which can be obtained through PDC Machines (Warminster, Pa.) or Howden & Sundyne (Arvada, Colo.) for example; or an ionic liquid filled compressor, which can be obtained from Linde (Pittston, Pa.) for example; or a labyrinth seal piston compressor, which can be obtained from Burckhardt Compression (Houston, Tex.) for example.

After safely compressing the gas and producing the feed source, the feed source is sent to a membrane separation unit. The membranes in the membrane separation unit are designed to allow hydrogen molecules to selectively pass through the membrane, exiting on the permeate side, leaving the oxygen on the higher-pressure retentate side. Hydrogen selective membranes are known to a skilled person and are commercially available. In certain aspects, hydrogen permeable membranes characterized by high hydrogen selectivity and high $H_2$ flow are used, such membranes include palladium-based or polymer membranes. In certain aspects, a thin palladium membrane is used, generally having a thickness of from 1 to 3 μm. These membranes can be manufactured according to the method described in "*Membrane Reactors for hydrogen production processes*", M. De Falco, L. Marrelli, G. Iaquaniello (Eds.), Springer, 2011.

The off gas produced by the membrane separation unit, which contains mainly oxygen (56 mol. % $O_2$, 33 mol. % $H_2$), is vented or reused. The permeate side containing hydrogen (in come instance having at least 90 mol. % $H_2$) exits the separation unit at a lower pressure. In certain aspects, a small amount of inert gas is added to reduce processing hazards. The membrane can have an estimated $H_2$ recovery of 70 to 80%.

Once the hydrogen gas is isolated by the membrane separation unit the hydrogen rich gas (hydrogen permeate) is compressed (e.g., to 30 bar) and is transmitted to a hydrogen purification unit. The hydrogen purification unit processes the hydrogen rich gas by combustion, which removes residual oxygen from the stream forming a purified stream. The purified stream is hot and can be used to raise medium pressure steam, while cooling the gas stream down to remove the water.

Hydrogen has a wide flammability range in comparison with other fuels. As a result, hydrogen can be combusted over a wide range of gas mixtures. Thus, hydrogen can combust in a mixture in which the gas content is less than the theoretical, stoichiometric or chemically ideal amount needed for combustion. Hydrogen has very low ignition energy. The amount of energy needed to ignite hydrogen is about one order of magnitude less than that required for gasoline.

The presence of a continuous explosive atmosphere during the processes disclosed herein will require the whole flowsheet to have zone 0 classification (minimizing spark generation). Pipework and membranes are made of a good electrical conducting polymer for the prevention of sparks.

FIG. 1 illustrates a flow diagram for one embodiment of the system. FIG. 1 illustrates a scheme 100 where reactants (e.g., water 102 and sacrificial agent 104) and catalyst 106 are provided in reactor 108 where photocatalytic water splitting is performed. Once the water is split the resulting gas stream 110 (e.g., $H_2$, $O_2$, and $CO_2$) is transferred to a first compressor 112 where is compressed to increase the pressure and form a feed source for membrane separation unit 114. In membrane separation unit 114, the feed source is exposed to a hydrogen permeable membrane that allows hydrogen to permeate the membrane forming a hydrogen rich permeate gas stream 116. Oxygen and other gases (e.g., $O_2$, and $CO_2$) are retained and are included in the membrane retentate 118. The retentate can be further processed or used, e.g., recycled or further processed. The permeate 116 is transferred to a second compressor 120 where it is compressed to increasing the pressure. The compressed permeate is introduced to a hydrogen purification unit 122 where it under goes a combustion process to further purify the hydrogen. The purified hydrogen stream 124 is then sent to storage unit 126 for storage or utilization. Heat generated by the combustion process can be used to produce medium pressure steam 128 that can be further utilized in other processes.

The examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The invention claimed is:

1. A process for producing hydrogen from water comprising:
   (a) contacting a water source with a water splitting photocatalyst and exposing the water/photocatalyst to light under conditions that split water into hydrogen and oxygen forming a feed source for hydrogen separation and purification;
   (b) separating hydrogen from a feed source by
      (i) compressing a feed source to at least 30 bars in a spark free environment forming a compressed feed source;
      (ii) separating hydrogen from the compressed feed source by contacting a selectively permeable membrane with the compressed feed source, wherein hydrogen selectively permeates the membrane forming a hydrogen permeate and a hydrogen deficient retentate; and
      (iii) collecting the hydrogen permeate; and
   (c) purifying the hydrogen permeate by
      (i) compressing the hydrogen permeate to at least 30 bars forming a compressed hydrogen permeate, and
      (ii) combusting the compressed hydrogen permeate to remove residual oxygen and forming a purified hydrogen stream comprising residual water or steam; and
   (d) collecting, storing, and/or utilizing the purified hydrogen.

2. The process of claim 1, further comprising cooling the hydrogen stream and dehydrating the hydrogen stream.

3. The process of claim 1, wherein combustion is performed at a pressure of at least 10 to 100 $kg/cm^2g$.

4. The process of claim 1, wherein combustion is performed at a pressure of at a temperature of about 500 to 2000° C.

5. The process of claim 1, wherein combustion is performed at a temperature of about 1400° C.

6. The process of claim 1, wherein combustion is performed at a pressure of at least 33 $kg/cm^2g$ and a temperature of about 1400° C.

7. The process of claim 1, wherein combustion is performed by auto-ignition of hydrogen and oxygen in the presence of a catalyst.

8. The process of claim 7, wherein the catalyst is a platinum catalyst.

9. The process of claim 1, further comprising collecting the retentate.

10. The process of claim 1, further comprising mixing the collected hydrogen permeate with an inert gas.

11. The process of claim 10, wherein the inert gas is argon or nitrogen.

12. The process of claim 1, wherein the feed source is compressed to at least 30, 40, 50, or 60 bar.

13. The process of claim 1, wherein the feed source comprises about 70 mol % hydrogen.

14. The process of claim 1, wherein the purified hydrogen permeate comprises at least 94 mol % hydrogen.

15. The process of claim 1, wherein the process is performed under conditions and using equipment to minimize spark generation.

16. A purified hydrogen stream produced by the process of claim 1.

17. The purified hydrogen stream of claim 16, wherein the hydrogen stream comprises at least 95% hydrogen.

18. The purified hydrogen stream of claim 16, wherein the hydrogen stream comprises at least 99% hydrogen.

19. A hydrogen purification system comprising:
   (a) a photocatalytic reactor configured to operate at approximately atmospheric pressure and to split water into hydrogen and oxygen;
   (b) a compressor configured to receive a feed stream from the photocatalyic reactor, the compressor being configured to compress the feed stream to at least 30 bar;
   (c) a membrane separation unit comprising a membrane that is selectively permeable to hydrogen and configured to (i) receive a pressurized feed stream from the compressor and (ii) produce a hydrogen permeate;
   (d) a second compressor configured to compress the hydrogen permeate to a pressure of at least 30 bar; and
   (e) a hydrogen purification unit configured to receive and combust the pressurized hydrogen permeate to produce a pressurized steam and a purified hydrogen stream.

20. The system of claim 19, further comprising a hydrogen storage device to collect and store the purified hydrogen stream.

* * * * *